United States Patent [19]

DesChamps

[11] Patent Number: 5,817,167
[45] Date of Patent: Oct. 6, 1998

[54] DESICCANT BASED DEHUMIDIFIER

[75] Inventor: Nicholas H. DesChamps, Fincastle, Va.

[73] Assignee: Des Champs Laboratories Incorporated, Natural Bridge, Va.

[21] Appl. No.: 701,255

[22] Filed: Aug. 21, 1996

[51] Int. Cl.⁶ .................................................. B01D 53/06
[52] U.S. Cl. .................................. 95/113; 55/269; 62/94; 62/271; 95/114; 95/115; 95/126; 96/125; 96/126; 96/146
[58] Field of Search .............................. 95/107, 113, 114, 95/115, 117, 119, 120, 121, 122, 123, 124, 125, 126, 288; 96/118, 108, 125, 126, 127, 146, 150; 55/267, 268, 269; 62/271, 94; 165/2, 3, 60

[56] References Cited

U.S. PATENT DOCUMENTS

| | | | |
|---|---|---|---|
| 1,602,500 | 10/1926 | Nuss . | |
| 1,814,028 | 7/1931 | Egli . | |
| 1,872,783 | 8/1932 | Miller . | |
| 1,912,784 | 6/1933 | Miller et al. . | |
| 2,661,808 | 12/1953 | Kahle | 183/4.7 |
| 2,675,089 | 4/1954 | Kahle | 183/4.7 |
| 2,811,223 | 10/1957 | Newton | 183/114.2 |
| 2,926,502 | 3/1960 | Munters et al. | 62/94 |
| 2,957,321 | 10/1960 | Munters et al. | 62/271 |
| 2,993,563 | 7/1961 | Munters et al. | 96/126 |

(List continued on next page.)

FOREIGN PATENT DOCUMENTS

| | | | |
|---|---|---|---|
| 54-146273 | 11/1979 | Japan | 96/127 |
| 57-28936 | 2/1982 | Japan | 95/113 |
| 58-138992 | 8/1983 | Japan | 96/125 |
| 62-176519 | 8/1987 | Japan | 96/118 |
| 6-472239 | 2/1994 | Japan | 96/125 |

OTHER PUBLICATIONS

Pesaran, Parent, Meckler and Novosel, Evaluation of a Liquid Desiccant–Enhanced Heat Pipe Air Preconditioner, May 4, 1995, pp. 713–724.

Davison Silicia Gels,.

Harriman III, The Dehumidification Handbook Second Edition, Munters Cargocaire, 1990, chapters 1–3 and 6.

W.R. Grace & Co. –Conn., Davison Chemical Division, How Silica Gel Works In Gas Phase, pp. 5–6.

W.R. Grace & Co.–Conn., Davison Chemical Divison, Fundamentals of Dynamic Adsorption, pp. 7, 10 and 11.

(List continued on next page.)

*Primary Examiner*—Duane S. Smith
*Attorney, Agent, or Firm*—Steinberg, Raskin & Davidson, P.C.

[57] ABSTRACT

A desiccant dehumidifier is provided in which a desiccant material is applied to a first end of a heat pipe heat exchanger. During the sorption phase, a supply air stream is exposed to the desiccant material on the first end of the heat pipe heat exchanger and a second air stream, which could be ambient atmosphere, is exposed to the second end of the heat pipe heat exchanger. The moisture from the supply air stream is transferred to the desiccant material. However, the heat pipe heat exchanger acts as a heat sink and adsorbs the heat generated by the moisture transfer and transfers it to the second end of the heat pipe heat exchanger. At the second end of the heat pipe heat exchanger, the heat is transferred to the second air stream. As a result, both the supply air stream and the desiccant material remain at a substantially constant temperature during the sorption phase. During the desorption phase, a heated air stream is exposed to the second end of the heat pipe heat exchanger, and a regeneration air stream is exposed to the first end of the heat pipe heat exchanger. The heat from the heated air stream is transferred to the heat pipe heat exchanger, and then from the heat pipe heat exchanger to the desiccant material. As a result, the surface vapor pressure of the desiccant material rises, and the moisture from the desiccant material is transferred to the regeneration air stream. In addition, in accordance with a further embodiment, after the heated air stream is cooled as it is transfers heat to the heat pipe heat exchanger, it is also used as the regeneration air stream.

19 Claims, 9 Drawing Sheets

U.S. PATENT DOCUMENTS

| | | | |
|---|---|---|---|
| 3,144,901 | 8/1964 | Meek | 165/6 |
| 3,251,402 | 5/1966 | Glav | 165/7 |
| 3,398,510 | 8/1968 | Pennington | 55/163 |
| 3,401,504 | 9/1968 | Moragne | 55/179 |
| 3,470,708 | 10/1969 | Weil et al. | 62/271 |
| 3,774,374 | 11/1973 | Dufour et al. | 55/316 |
| 3,844,737 | 10/1974 | Macriss et al. | 55/34 |
| 3,855,719 | 12/1974 | Jonsson | 96/118 |
| 3,880,224 | 4/1975 | Weil | 165/2 |
| 4,062,129 | 12/1977 | Yoshida et al. | 34/80 |
| 4,134,743 | 1/1979 | Macriss et al. | 55/34 |
| 4,176,523 | 12/1979 | Rousseau | 62/2 |
| 4,180,126 | 12/1979 | Rush et al. | 165/59 |
| 4,180,985 | 1/1980 | Northrup, Jr. | 62/94 |
| 4,185,969 | 1/1980 | Bulang | 55/31 |
| 4,313,312 | 2/1982 | Ito et al. | 62/271 |
| 4,341,539 | 7/1982 | Gidaspow et al. | 96/127 |
| 4,391,616 | 7/1983 | Imanmura | 96/125 |
| 4,430,864 | 2/1984 | Mathiprakasam | 62/94 |
| 4,484,617 | 11/1984 | Sizmann | 165/1 |
| 4,497,361 | 2/1985 | Hajicek | 165/7 |
| 4,527,398 | 7/1985 | Schaetzle | 62/94 |
| 4,536,198 | 8/1985 | Strain | 55/33 |
| 4,574,872 | 3/1986 | Yano et al. | 96/125 |
| 4,594,860 | 6/1986 | Coellner et al. | 96/118 |
| 4,631,074 | 12/1986 | Eschner | 55/27 |
| 4,650,575 | 3/1987 | White, Jr. | 210/183 |
| 4,701,189 | 10/1987 | Oliker | 55/34 |
| 4,711,097 | 12/1987 | Besik | 62/271 |
| 4,723,417 | 2/1988 | Meckler | 62/271 |
| 4,769,053 | 9/1988 | Fischer, Jr. | 55/389 |
| 4,775,484 | 10/1988 | Schmidt et al. | 210/673 |
| 4,778,492 | 10/1988 | Dawson | 96/125 |
| 4,860,548 | 8/1989 | Ryham | 62/94 |
| 4,926,618 | 5/1990 | Ratliff | 95/113 |
| 4,941,324 | 7/1990 | Peterson et al. | 62/94 |
| 4,948,392 | 8/1990 | Rush | 55/34 |
| 5,024,062 | 6/1991 | Hellman | 62/92 |
| 5,040,375 | 8/1991 | Von Dobeln | 62/94 |
| 5,042,266 | 8/1991 | Yamashita et al. | 62/271 |
| 5,057,128 | 10/1991 | Panzica et al. | 55/181 |
| 5,070,703 | 12/1991 | Wilkinson | 62/94 |
| 5,147,420 | 9/1992 | Claesson | 55/34 |
| 5,148,374 | 9/1992 | Coellner | 364/505 |
| 5,167,679 | 12/1992 | Maekawa et al. | 55/208 |
| 5,169,414 | 12/1992 | Panzica et al. | 55/60 |
| 5,170,633 | 12/1992 | Kaplan | 62/94 |
| 5,176,005 | 1/1993 | Kaplan | 62/94 |
| 5,238,052 | 8/1993 | Chagnot | 96/127 |
| 5,242,473 | 9/1993 | Ogasahara | 96/125 |
| 5,431,716 | 7/1995 | Ebbeson | 96/125 |
| 5,448,895 | 9/1995 | Coellner et al. | 62/94 |
| 5,460,004 | 10/1995 | Tsimerman | 62/94 |
| 5,502,975 | 4/1996 | Brickley et al. | 62/94 |
| 5,512,083 | 4/1996 | Dunne | 95/113 |

OTHER PUBLICATIONS

W.R. Grace & Co.–Conn., Davison Chemical Division, Factors Affecting The Dynamic Capacity of Silica Gel Adsorbers, pp. 11–14.

Adcoa Adsorbents & Desiccants Corp of America, Technical Data Sheets.

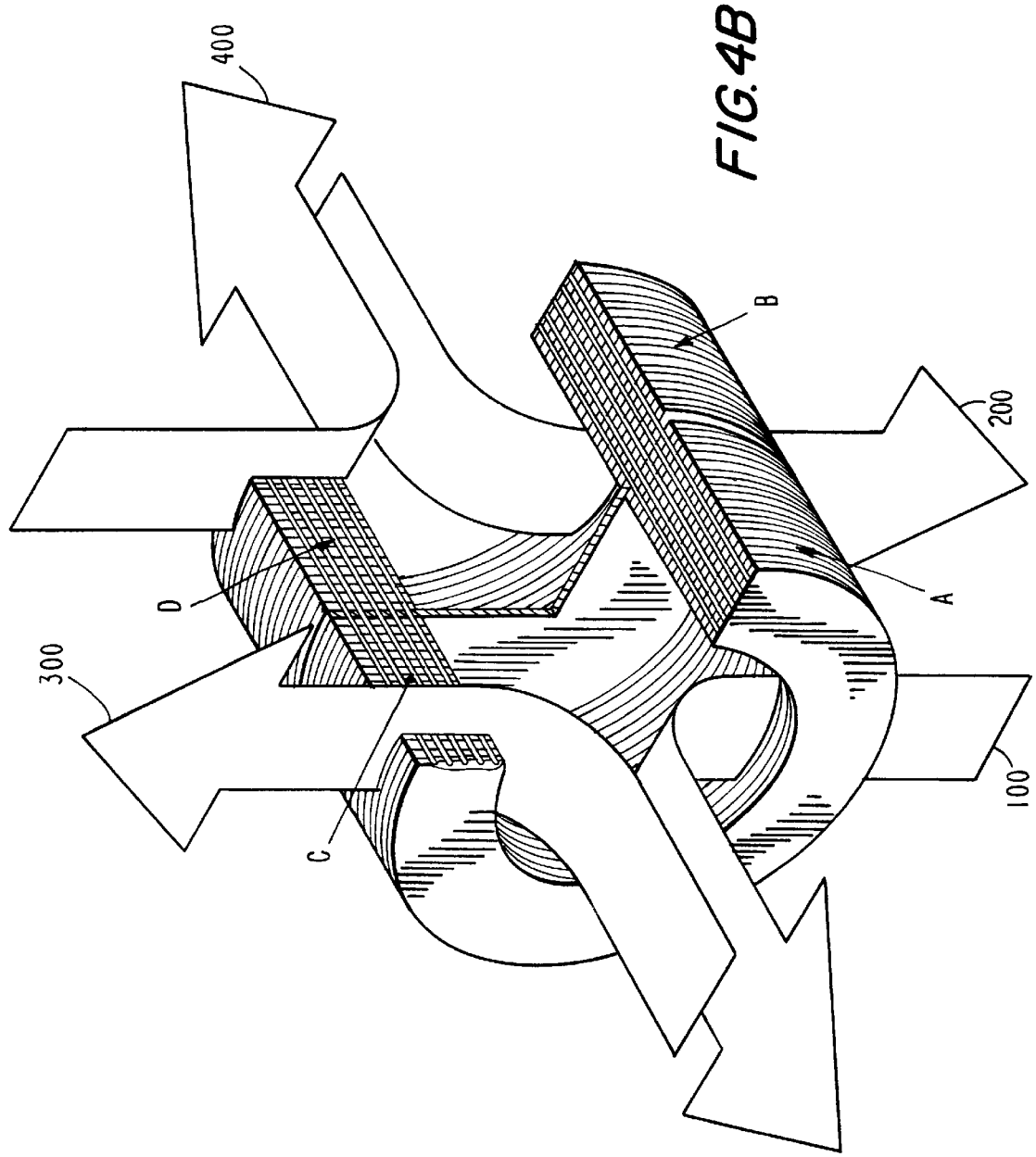

DESICCANT BASED DEHUMIDIFIER

FIELD OF THE INVENTION

The present invention relates to the field of desiccant dehumidifiers.

BACKGROUND OF THE INVENTION

Desiccant dehumidifiers as well as cooling-based dehumidifiers are known. Cooling-based dehumidifiers operate to cool an incoming air supply in order to cause condensation of the moisture in the air, resulting in a dehumidification of the air. In contrast, desiccant dehumidifiers, utilize a desiccant material to attract moisture from the incoming air supply by creating an area of low vapor pressure at the surface of the desiccant. Since the pressure exerted by the water in the air is higher than the pressure at the surface of the desiccant, the water molecules move from the air to the desiccant and the air is dehumidified.

Most solid materials can attract moisture in the above manner. For instance, nylon can absorb up to 6% of its dry weight in water vapor. The oxide layer on metal surfaces attract and hold water vapor under the right conditions.

Desiccants designed for water vapor collection, in contrast, generally attract and hold from 10 to 10,000 percent of their dry weight in water vapor. Desiccants are characterized by their low surface vapor pressure. If the desiccant is cool and dry, its surface vapor pressure is low, and it can attract moisture from the air, which has a relatively high vapor pressure when it is moist. If the desiccant becomes moist and hot, its surface vapor pressure is high, and it will give off water vapor to the surrounding air. Vapor moves from the air to the desiccant and back again depending on the vapor pressure differential.

Desiccant dehumidifiers control vapor pressures to dry air continuously in a repeating cycle. Initially, the desiccant is relatively cool ("state 1"), and therefore has a low surface vapor pressure. As supply air passes over the desiccant, moisture from the air is attracted to the desiccant. This is often referred to as the sorption process. However, movement of the moisture from the air causes an increase in the temperature of the air. This increase in temperature, in turn, increases the temperature of the desiccant. Eventually, the vapor pressure at the surface of the desiccant approaches that of the surrounding air because it becomes moist and warm ("state 2"). Once the vapor pressure at the surface of the desiccant equals the vapor pressure of the surrounding air, the desiccant will cease collecting moisture.

The desiccant is then taken out of the moist air and placed into a different, heated air stream. The hot air heats the desiccant and causes the vapor pressure on the surface of the desiccant to be higher than the vapor pressure of the moisture in the heated air stream, thereby causing the moisture to leave the desiccant surface ("state 3"). This is often referred to as the desorption process, or regeneration process. At this point, the desiccant is dry, but relatively hot. The desiccant is then cooled returning it to its initial condition ("state 1", cool and dry) completing the cycle so that the desiccant can begin collecting moisture once again. This is often referred to as the cooling process.

Thermal energy drives this cycle. The desiccant is heated to drive moisture off its surface (state 2 to state 3) and cooled to restore its low vapor pressure (state 3 to state 1). The heating of the desiccant from state 1 to state 2 is caused by the heating of the conditioned air as water molecules in the gaseous phase are changed to water molecules in a stationary condition, attached to the surface of the desiccant. The efficiency of the process improves when the desiccant has high moisture capacity. In addition, since the desiccant must be heated to drive off moisture, the use of a low mass desiccant, which requires less energy to heat, also improves the efficiency of the process.

SUMMARY OF THE INVENTION

One use for desiccant dehumidification is to condition air for "space air conditioning," a market currently dominated by mechanical air conditioners. However, since, in a desiccant system the process air is heated as it dries during the sorption process, additional hardware is needed to remove the heat from the process air before it can be delivered to the space. Such hardware, may include, for example, air-to-air heat exchangers, direct evaporative coolers, mechanical cooling coils, indirect evaporative cooling, or a combination thereof. Therefore, there is a need for a desiccant dehumidification system in which the process air experiences little or no temperature increase as it transfers moisture to the desiccant material.

Another undesirable effect of the sensible temperature rise of the process air during the sorption process is that the desiccant, because it is surrounded by the process air, also rises in temperature along with the process air. This is disadvantageous because a higher desiccant temperature results in a higher desiccant surface vapor pressure. The higher the desiccant surface vapor pressure, the less moisture the desiccant can adsorb during the sorption process.

However, if the temperature rise at the surface of the desiccant can be avoided, then the desiccant will be able to adsorb more water for any given amount of desiccant. In addition, with a lower desiccant temperature during the sorption phase, the desiccant can be regenerated at a lower temperature during the desorption or regeneration process. This is because the desiccant must be heated during the regeneration process in order to create a higher vapor pressure at the surface of the desiccant than in the surrounding air. If the desiccant enters the regeneration process at a lower temperature, it is not necessary to add as much heat in order to create the requisite pressure differential.

In accordance with the present invention, a desiccant material is applied to a first end of a heat pipe heat exchanger. During the sorption phase, a supply air stream is exposed to the desiccant material on the first end of the heat pipe heat exchanger and a second air stream, which could be ambient atmosphere, is exposed to the second end of the heat pipe heat exchanger. The moisture from the supply air stream is transferred to the desiccant material. However, the heat pipe heat exchanger acts as a heat sink and adsorbs the heat generated by the moisture transfer and transfers it to the second end of the heat pipe heat exchanger. At the second end of the heat pipe heat exchanger, the heat is transferred to the second air stream. As a result, both the supply air stream and the desiccant material remain at a substantially constant temperature during the sorption phase. These two parameters are also influenced by the state of the entering, second air stream.

During the desorption phase, a heated air stream is exposed to the second end of the heat pipe heat exchanger, and a regeneration air stream is exposed to the first end of the heat pipe heat exchanger. The heat from the heated air stream is transferred to the heat pipe heat exchanger, and then from the heat pipe heat exchanger to the desiccant material. As a result, the surface vapor pressure of the desiccant material rises, and the moisture from the desiccant material is transferred to the regeneration air stream. In addition, in accordance with a further embodiment of the present invention, after the heated air stream is cooled as it is transfers heat to the heat pipe heat exchanger, it is also used as the regeneration air stream. Finally, when the desiccant is once again exposed to the supply air stream, it will cool to the temperature of the supply air stream and then the sorption process will begin again.

BRIEF DESCRIPTION OF THE DRAWINGS

FIG. 4(b) is the dehumidifier of FIG. 4(a) shown with the process, regeneration, and heated air steams.

DETAILED DESCRIPTION OF THE INVENTION

FIGS. 1(a)–(c) illustrate the sorption, desorption, and cooling processes of conventional desiccant dehumidifiers. While conventional desiccant dehumidifiers have a variety of constructions, they share a common functionality. A desiccant material is sequentially exposed to a supply air flow, a regeneration air flow, and a cooling air flow. FIGS. 1(a)(c) illustrate the moisture content and vapor pressure of a desiccant material of a conventional desiccant dehumidifier in three states, numbered 1 through 3.

Figure 1:
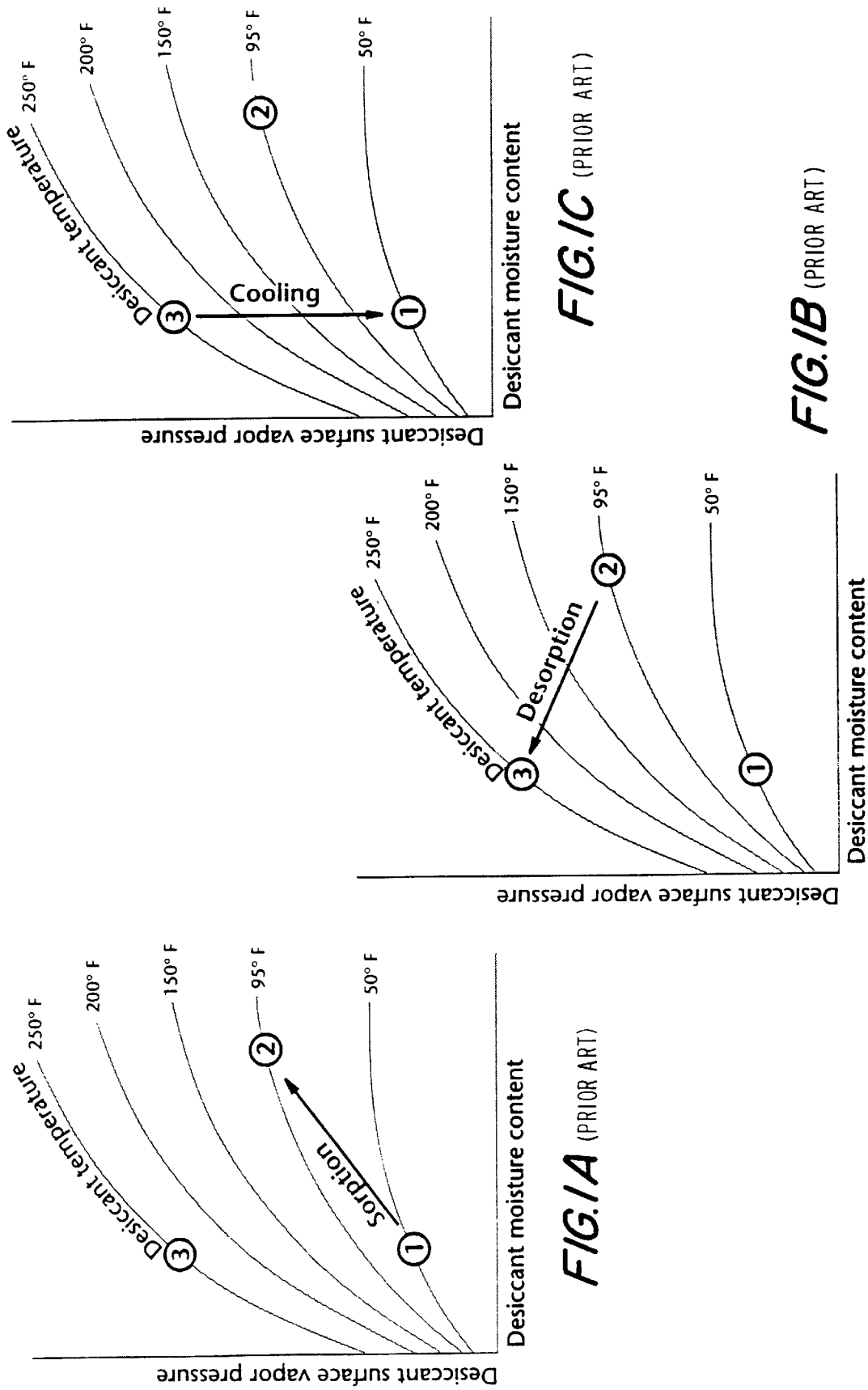
FIGS. 1(a–c) (Prior Art) are illustrative graphs showing the sorption, desorption, and cooling processes.
Figure 2:
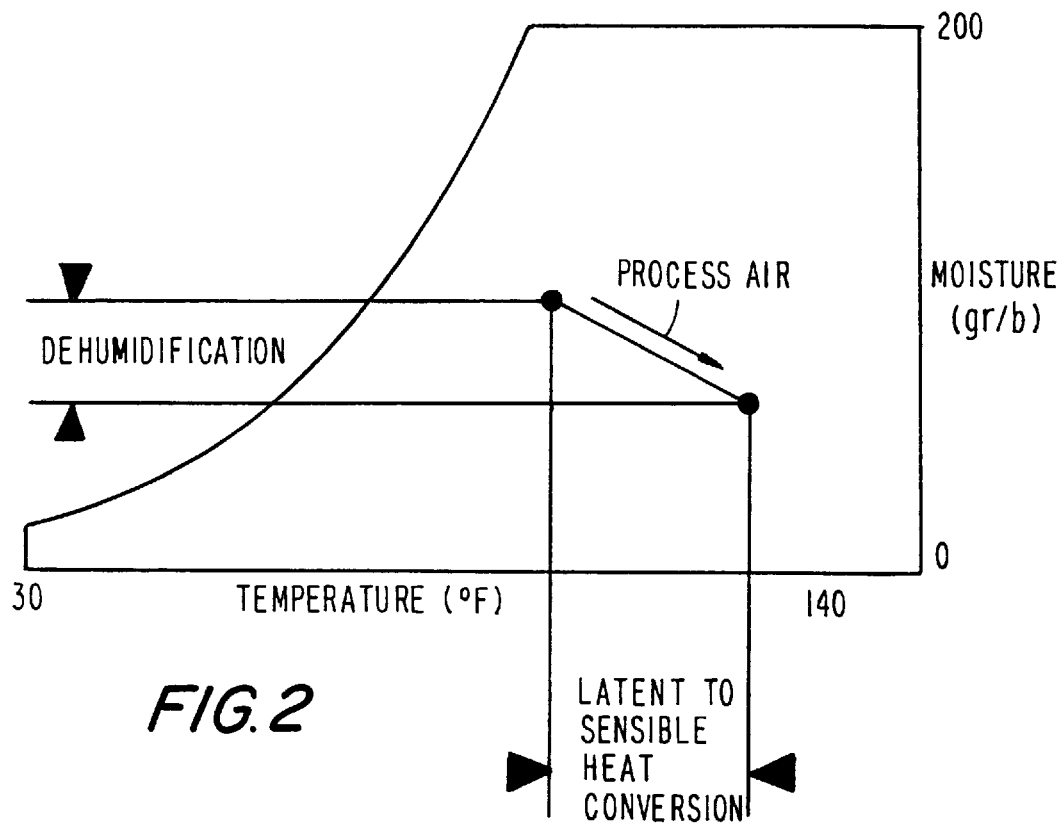
FIG. 2 is an illustrative psychrometric chart showing the adiabatic sorption process.

Referring to FIG. 1 (a), in its initial state 1, the desiccant is relatively cool and dry. Then the desiccant is exposed to the process air. Since the surface vapor pressure of the desiccant is lower than the vapor pressure of the process air, a sorption process occurs, transferring the moisture from the process air to the desiccant. Eventually, the vapor pressure of the process air will equal the surface vapor pressure of the desiccant, and the sorption process will cease. As illustrated in FIG. 1(a) at state 2, the sorption process results in an increased moisture content in the desiccant. However, as the moisture leaves the air, this reaction liberates heat, increasing the temperature of the air. The increased air temperature, in turn, heats the desiccant as shown in state 2. Referring to FIG. 2, the increase in the temperature of the process air flow during dehumidification is directly proportional to the amount of moisture removed from the air.

After the desiccant reaches state 2, it is then exposed to the regeneration air stream of relatively hot, dry air. Since the regeneration air stream has a vapor pressure which is much lower than the surface vapor pressure of the desiccant at state 2, a desorption process occurs, transferring the moisture from the desiccant to the regeneration air stream. Once the vapor pressure of the regeneration air stream equals the surface vapor pressure of the desiccant, the desorption process will cease. As illustrated in FIG. 1(b), at state 3, the desorption process has resulted in a decrease in the moisture content of the desiccant. In addition, while the temperature of the regeneration air stream has been reduced due to its absorption of the moisture from the air, the temperature of the regeneration air stream will still be above the state 2 temperature of the desiccant. Therefore, as shown, in FIG. 1(b), at state 3 the desiccant exhibits a decreased moisture content, but also an increased temperature.

At state 3 the desiccant has a sufficiently low moisture level, but because of to its high temperature, has too high a surface vapor pressure to adsorb moisture. Therefore, the desiccant must be exposed to a cooling source, such as a heat exchanger connected to a chilling system or cooling tower, until it returns to state 1 as shown in FIG. 1(c). This completes the cycle. Alternatively, the desiccant will be cooled as it is exposed to the process air during the beginning of the sorption process.

As stated above, desiccant dehumidification has potentially broad application in the conditioning of air for "space air conditioning," a market currently dominated by mechanical air conditioners. However, since, in a desiccant system the process air is heated as it dries during the sorption process, additional hardware is needed to remove the heat from the process air before it can be delivered to the space. Such hardware, may include, for example, air-to-air heat exchangers, direct evaporative coolers, mechanical cooling coils, indirect evaporative cooling, or a combination thereof. Therefore, there is a need for a desiccant dehumidification system in which the process air experiences little or no temperature increase as it transfers moisture to the desiccant material.

Another undesirable effect of the sensible temperature rise of the process air during the sorption process is that the desiccant, because it is surrounded by the process air, also rises in temperature along with the process air. This is disadvantageous because a higher desiccant temperature results in a higher desiccant surface vapor pressure. The higher the desiccant surface vapor pressure, the less moisture the desiccant can adsorb from the process air during the sorption process. Therefore, it is desirable to reduce the sensible temperature rise of the desiccant, or even to cause the temperature of the desiccant to decrease, as the moisture is removed from the process air.

In addition, if the temperature of the desiccant is lowered, the desiccant can adsorb considerably more water per unit of desiccant because the surface vapor pressure of the desiccant will be lower. Moreover, with a lower desiccant temperature, the supply air could be dried to a much lower level because the lower surface vapor pressure of the desiccant would permit a greater volume of moisture to be removed from the process air.

In addition, with a lower desiccant temperature during the sorption phase, the desiccant can be regenerated at a lower temperature during the desorption or regeneration process. This is because the desiccant must be heated during the regeneration process in order to create a higher vapor pressure at the surface of the desiccant than in the surrounding air. If the desiccant enters the regeneration process at a lower temperature, and therefore a lower surface vapor pressure, it is not necessary to add as much heat in order to create the pressure differential.

For example, if the regeneration temperature could be lowered to a level where waste heat is generally available, then air conditioning could be performed with no process energy cost. In addition, if the regeneration temperature could be lowered to 50° F. to 150° F., solar heated air could be used for regeneration. This is a significant advantage because solar energy is most abundant when cooling is required, i.e., in the summer.

Conventionally, a heated regeneration air stream is caused to flow over the regeneration portion of the desiccant system in order to trigger the desorption process. The combination of air flow and initial temperature must result in an air flow stream with sufficient energy so that when the desorption process takes place, an energy balance exists between the sorptive process and the desorption process. In other words, the desorption process must generate enough energy to remove all of the moisture adsorbed by the desiccant during the sorptive process. The energy balance, in simplified form, is $(SCFM \times \Delta T)_{sorptive} = (SCFM \times \Delta T)_{desorption}$, where SCFM is the mass flow of the air stream, and T is temperature of the air stream. Therefore, there either must be a high temperature and lesser desorption air stream flow or a lower temperature and larger desorption air stream flow. Neither is desirable. Creating high temperatures is generally expensive, and creating high air flow requires equipment which is both large and expensive.

Therefore, it is desirable to provide a desiccant dehumidifier which utilizes low air mass flow and low temperature during the regeneration process. In accordance with the present invention, this is accomplished by heating the desiccant during the regeneration process from within by its own internal heat source. By heating the desiccant from within, the energy balance between the sorptive and desorptive processes can be achieved with a much lower temperature heat source because the desiccant can be maintained at a nearly constant temperature. Normally, as the regeneration air stream cools during the desorption process as a result of evaporative cooling, the desiccant cools down as well. In addition, in conventional systems the regeneration air must enter at a temperature high enough so that sufficient moisture is removed during the regeneration process despite the evaporative cooling of the air stream. If the energy for desorption comes from within the desiccant, then the temperature of the desiccant can be controlled so that the temperature change of the regeneration air flow is negligible. Therefore, untempered ambient air, exhaust air from a building, or the cooled heated air steam, can be used as the regeneration air flow to carry off the moisture from the desiccant. Moreover, instead of having the temperature of the regeneration air decrease as it traverses the desiccant (thereby inhibiting the air's ability to adsorb moisture), its temperature increases (thereby enhancing the air's ability to adsorb moisture). Therefore, air having a relatively low temperature, for example, 120° F., can be used as the regeneration air flow and maintained at this temperature during the entire desorptive process.

Figure 3:
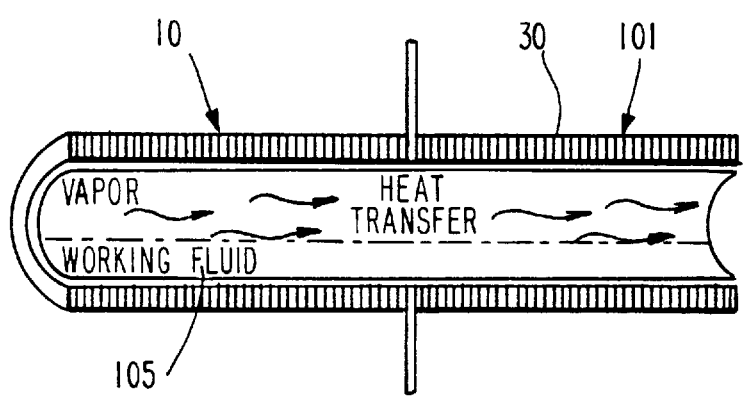
FIG. 3 shows an illustrative prior art heat pipe heat exchanger which is suitable for use with the present invention.

In accordance with the present invention, a desiccant dehumidifier is provided which utilizes a low air flow and low temperature for the regeneration air stream. In accordance with the present invention, a desiccant material such as silica gel, molecular sieve, or a polymer is applied to a first end of a heat pipe heat exchanger. FIG. 3 shows an illustrative prior art heat pipe heat exchanger which is suitable for use with the present invention. The heat pipe heat exchanger 10 is formed of a tube 101 containing a liquid/vapor heat transfer medium 105. The tube 101 includes fins 30. Since the medium 105 in the tube 101 exists in liquid vapor equilibrium, the entire length of the tube exhibits substantially the same temperature.

During the sorption phase, a supply air stream is exposed to the desiccant material on the first end of the heat pipe heat exchanger and a second air stream, which could be ambient atmosphere, is exposed to the second end of the heat pipe heat exchanger. The moisture from the supply air stream is transferred to the desiccant material. However, the heat pipe heat exchanger acts as a heat sink and adsorbs the heat generated by the moisture transfer and transfers it to the second end of the heat pipe heat exchanger. At the second end of the heat pipe heat exchanger, the heat is transferred to the second air stream. As a result, both the supply air stream and the desiccant material remain at a substantially constant temperature during the sorption phase.

During the desorption phase, a heated air stream is exposed to the second end of the heat pipe heat exchanger, and a regeneration air stream is exposed to the first end of the heat pipe heat exchanger. The heat from the heated air stream is transferred to the heat pipe heat exchanger, and then from the heat pipe heat exchanger to the desiccant material. As a result, the surface vapor pressure of the desiccant material rises, and the moisture from the desiccant material is transferred to the regeneration air stream. In addition, since the heated air stream is cooled as it is transfers heat to the heat pipe heat exchanger, this air stream, having been cooled to a lower vapor pressure, can be used as the regeneration air stream. When the desiccant is once again exposed to the supply air stream, it will cool to the temperature of the supply air stream and then the sorption process will begin again.

Figure 4A:
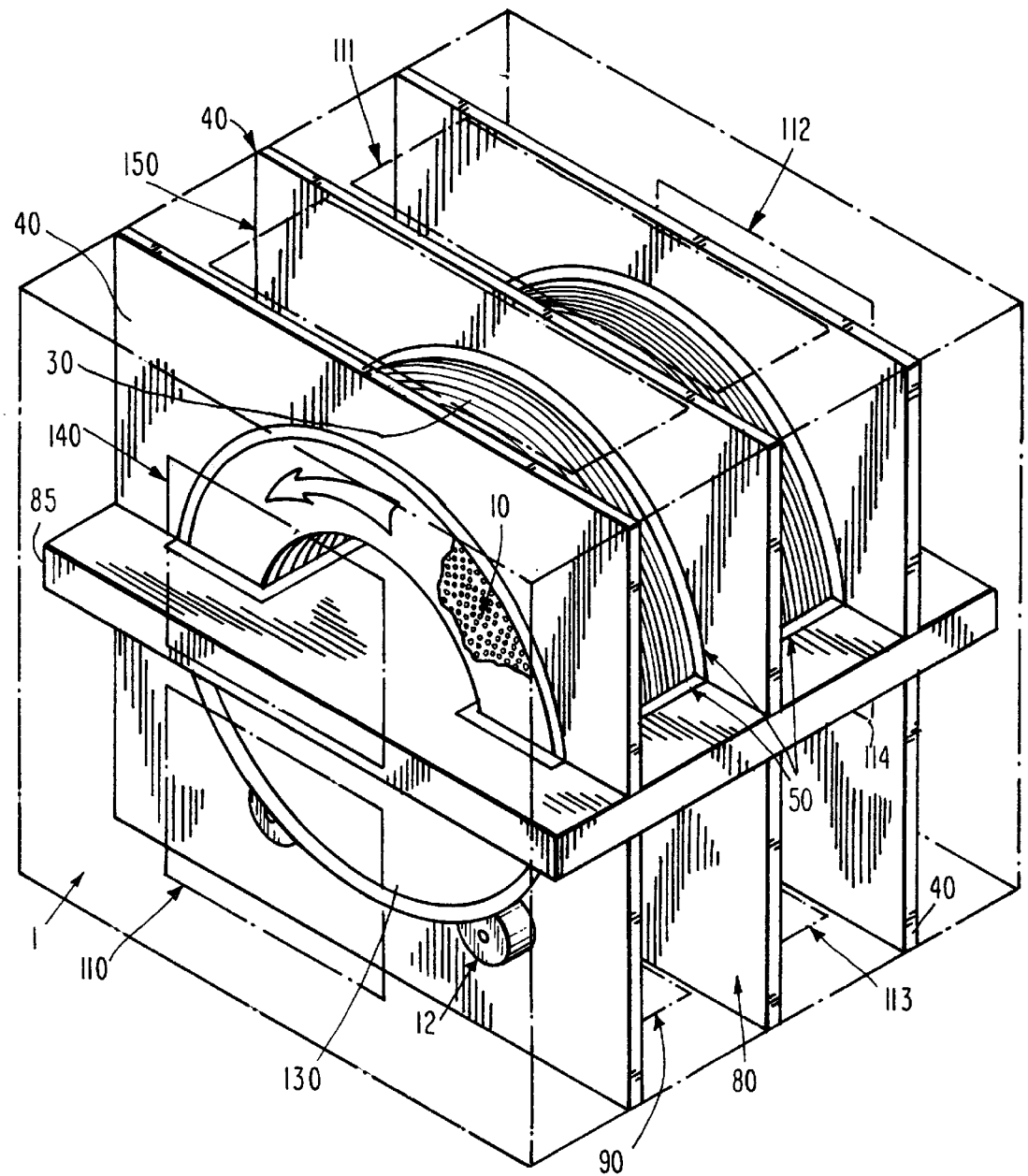
FIG. 4(a) is a view of the non-adiabatic dehumidifier according to a first embodiment of the present invention.
Figure 4C:
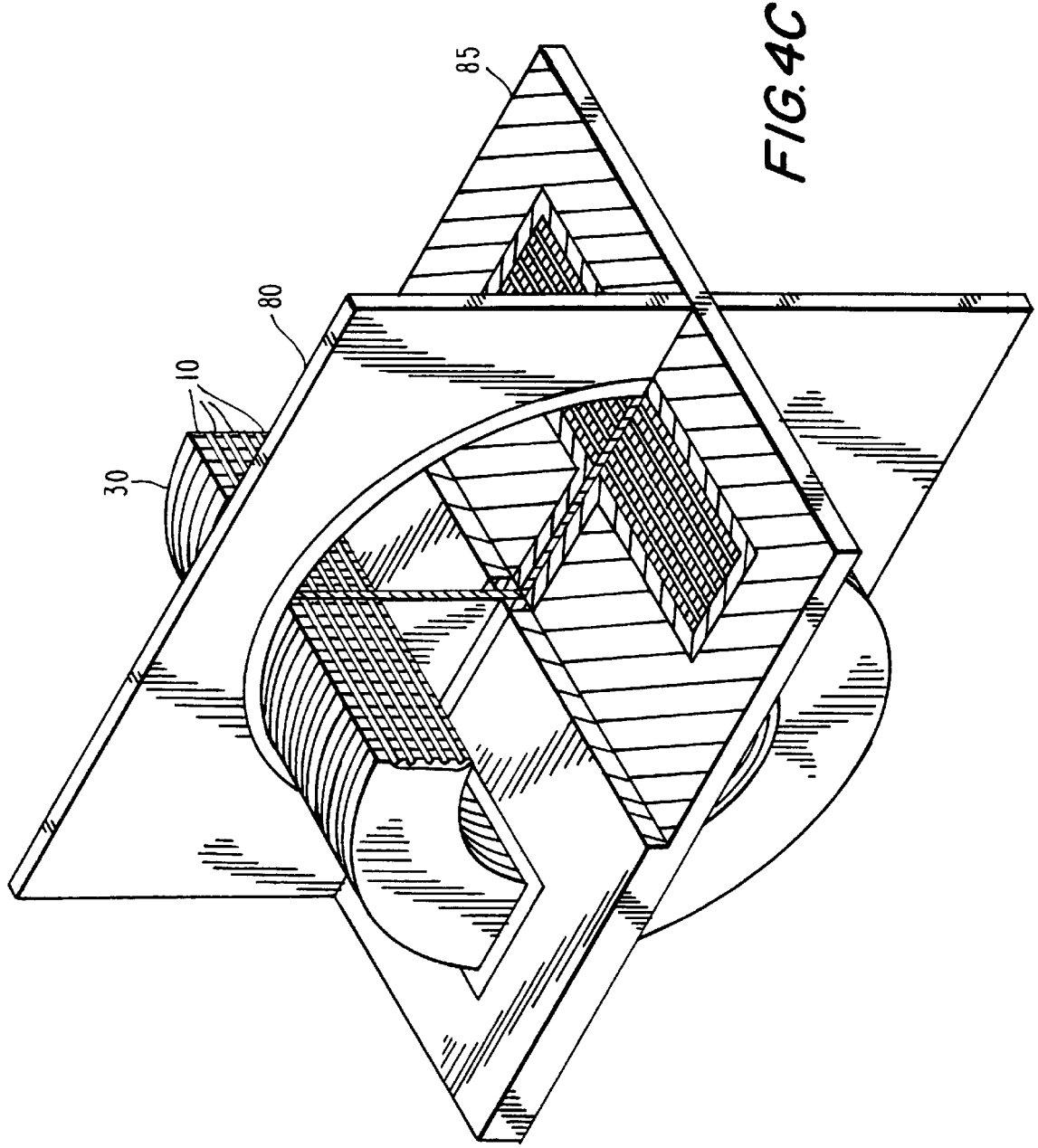
FIG. 4(c) is another view of the dehumidifier of FIG. 4(a) showing the heat pipe heat exchangers in cross-section.

FIGS. 4(a-c) show a dehumidifier according to a first embodiment of the present invention. A plurality of heat pipe heat exchangers 10 form a wheel 130. A vertical divider 80, a horizontal divider 85, and a pair of outer partitions 40 are encased in a housing 1 to form four quadrants A, B, C, and D. In quadrants A and C, a desiccant material is integrally bonded to the fins 30 of the heat exchangers 10. The wheel 130 is rotated by rollers 12 driven by a motor (not shown). Seals 50 insure that air will not flow between quadrants. A supply air inlet 90 and supply air outlet 110 are connected to quadrant A. A regeneration air inlet 140 and regeneration air outlet 150 are connected to quadrant C. A heated air inlet 111 and heated air outlet 112 are connected to quadrant D. A cooling air inlet 114 and cooling air outlet 113 are connected to quadrant B.

In accordance with a further embodiment of the present invention, the fins 30 are preferably made from 0.004-inch aluminum, coated with a desiccant material, and spaced 14 fins to the inch. The fins could be manufactured with collared holes for the heat pipe heat exchanger to pass through, and with radial ribs to insure that air flows radially between heat pipes.

Figure 5:
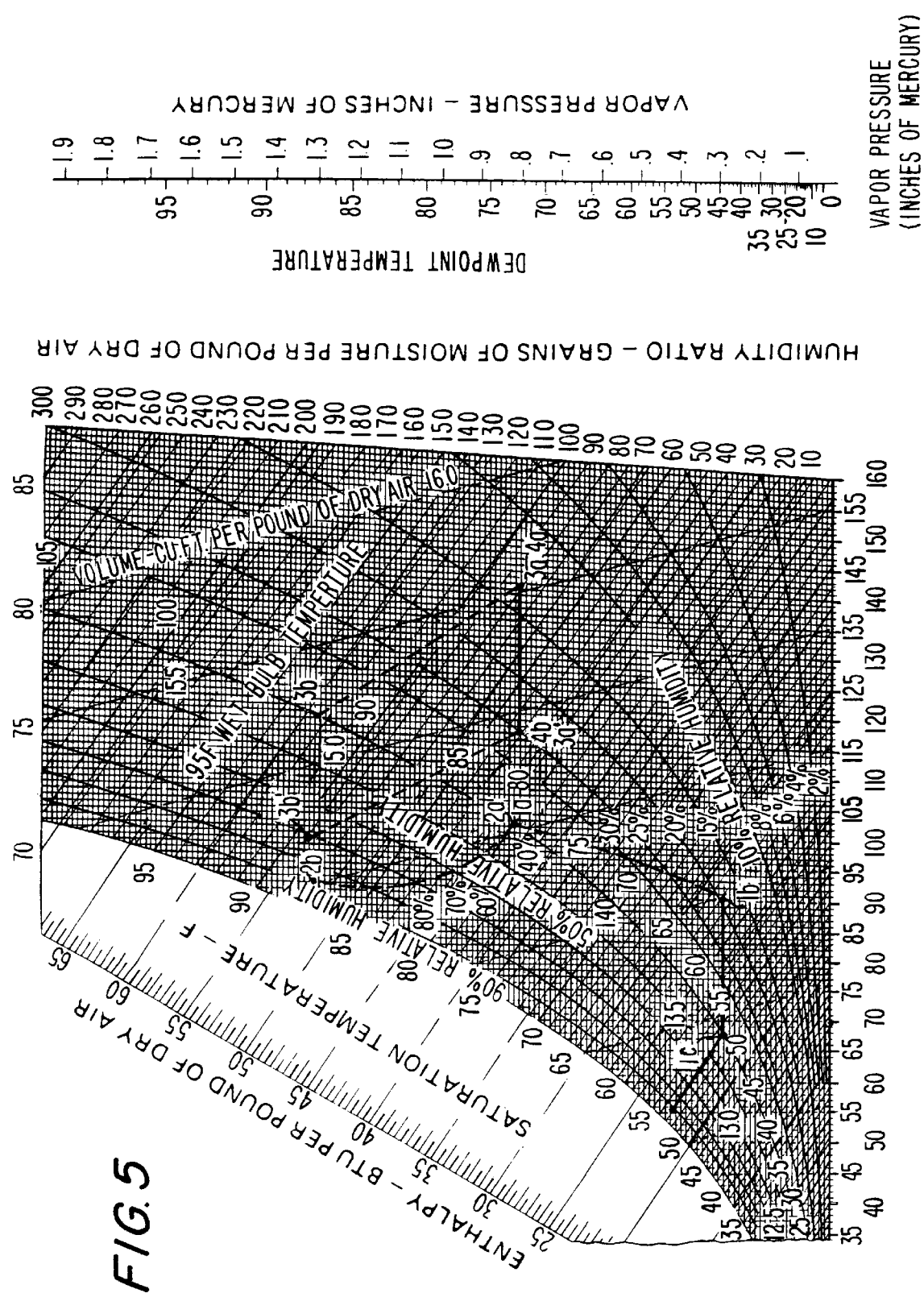
FIG. 5 is an illustrative graph showing the sorption, desorption, and cooling processes for the dehumidifier according to the present invention.

FIG. 5 shows an illustrative psychrometric chart for the dehumidifier of FIGS. 4(a-c). In this example, the supply air stream 100 begins as "outdoor" air at 95° F. dry bulb and 116 grains of moisture as it enters quadrant A (point 1A). During operation, as supply air stream 100 passes through quadrant A, the desiccant on the heat pipe heat exchangers are relatively cool and dry with a low surface vapor pressure. Since the supply air has a higher vapor pressure, moisture travels from the air to the desiccant, and the supply air is dried to 40 grains of moisture. However, because of the heat pipe heat exchanger, the heat generated by this condensation is adsorbed by the heat pipe heat exchanger, transferred to quadrant B, and then to the cooling air stream 200.

Therefore, the temperature of the supply air stream 100 decreases slightly to 90° F. The cooling air stream 200 (point 2a–2b), also begins from an outdoor air source (95° F. dry bulb and 117 grains of moisture). In this example, the cooling air stream 200 has water sprayed into it and onto the heat pipe heat exchangers in quadrant B as the cooling air stream 200 traverses quadrant B. Due to evaporative cooling, the heat transferred from quadrant A to quadrant B is dissipated as the water sprayed on the heat pipe heat exchangers in quadrant B evaporates into the cooling air stream, leaving the cooling air stream 200 at 90° F. dry bulb and 206 grains of moisture. Moreover, since in this example the mass flow of stream 200 is equal to the mass flow of stream 100, the enthalpy (energy in BTU/lb) gain between points 2a–2b are equal to the enthalpy decrease between points 1a–1b.

If the dehumidifier were to be used in a creature comfort application, it may be desirable to further sensibly cool the supply air stream 100 from point 1b to point 1c. This could be accomplished as follows. An additional component, an air to air heat exchanger with an indirect evaporative cooling feature could be provided. The air to air heat exchanger includes a supply air passage having a supply input connected to the supply air stream output 110, and a supply output connected to the space to be cooled. The air to air heat exchanger further includes an exhaust air passage having an exhaust input connected to the space to be cooled and an exhaust output connected to outdoor air. Water is sprayed into spent, stale air leaving the space to be cooled as it passes through the exhaust air passages of the air-to-air heat exchanger, which in turn, cools the process air in the supply air passage of the heat exchanger. This process cools the air to 67° F. and 40 grains of moisture. Further cooling could be achieved by passing the process air through a direct evaporative cooler to obtain a final temperature of 55° F. and 60 grains of moisture (points 1c to 1d). In this condition, the energy of the process air is sufficient to cool the space and control the relative humidity of the space.

Referring again to FIG. 4(*a,b*), in order to provide a continuous dehumidification process, the wheel 130 rotates in order to allow regeneration of the desiccant. As the wheel rotates, for example, at 5 to 15 revolutions per hour, the desiccant covered heat pipe heat exchangers which were initially in quadrant A during the sorption process, rotate into quadrant C in order to undergo desorption. Referring to FIGS. 4*a,b*, a heated air stream 400 enters quadrant D via heated air inlet 111 passes over heat pipe heat exchangers 10, and exits via the heated air outlet 112. As the heated air passes over the heat pipe heat exchangers 10 in quadrant D, the heat is adsorbed by the heat pipe heat exchangers and transferred to the desiccant coated fins 30 in quadrant C. The heat raises the surface vapor pressure of the desiccant, and causes the moisture from the desiccant to evaporate into the regeneration air stream 300. The constant supply of heat from the heated air stream 400 to the desiccant allows quadrant C to remain at or near a constant temperature as the moisture evaporates from the desiccant.

Referring again to the illustrative psychrometric chart of FIG. 5, the heated air stream traverses the path from point 4a to point 4b and the regeneration air stream traverses the path from point 3a to 3b. In this example, the mass flow of supply air stream 100 is equal to the mass flow of regeneration air stream 300. Therefore, the moisture increase of air stream 300 must equal the moisture decrease of air stream 100 in order to return the desiccant to its initial state (point 1a). In addition, there must be an energy balance between regeneration air flow 300 and heated air flow 400. As an illustration, outdoor air at 95° F. and 117 grains of moisture can be heated to 140° F. and delivered as equal air streams 300 and 400, shown as points 3a and 4a respectively. As the air stream 400 transfers heat to the heat pipe heat exchanger 10 and to the desiccant in quadrant C, it cools sensibly to 116° F. and 117 grains of moisture. Regeneration air stream 300 evaporates moisture from the desiccant and cools to 117° F. and 194 grains of moisture (point 3b), thereby removing the 77 grains of moisture which has been adsorbed by the desiccant during the sorption process. Thereafter, as the wheel 130 rotates the desiccant back into quadrant A, the temperature of the desiccant returns to 95° F. dry bulb, and the sorption process begins again.

Figure 6A:
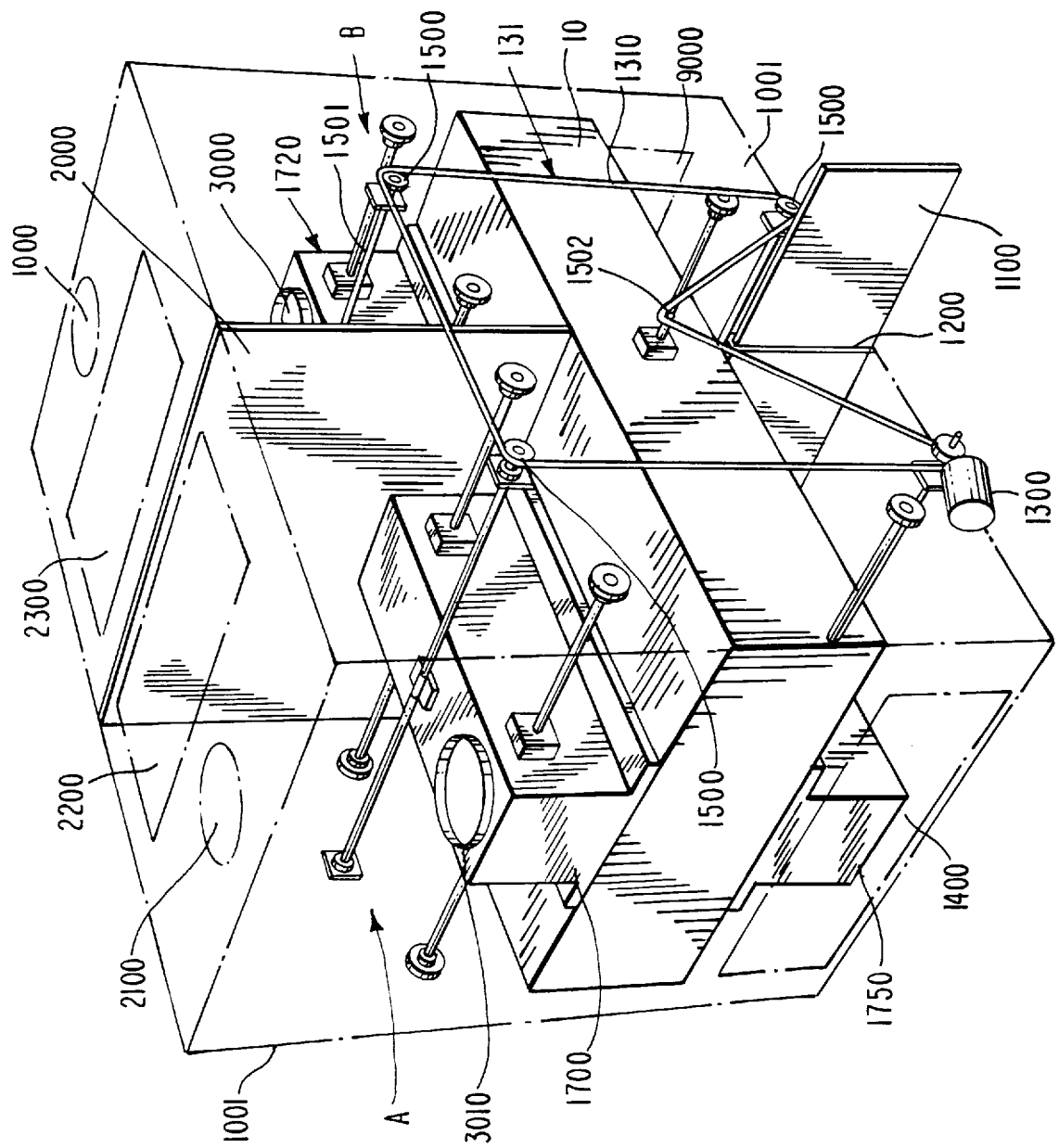
FIG. 6(a) shows a dehumidifier according to a second embodiment of the present invention.
Figure 6B:
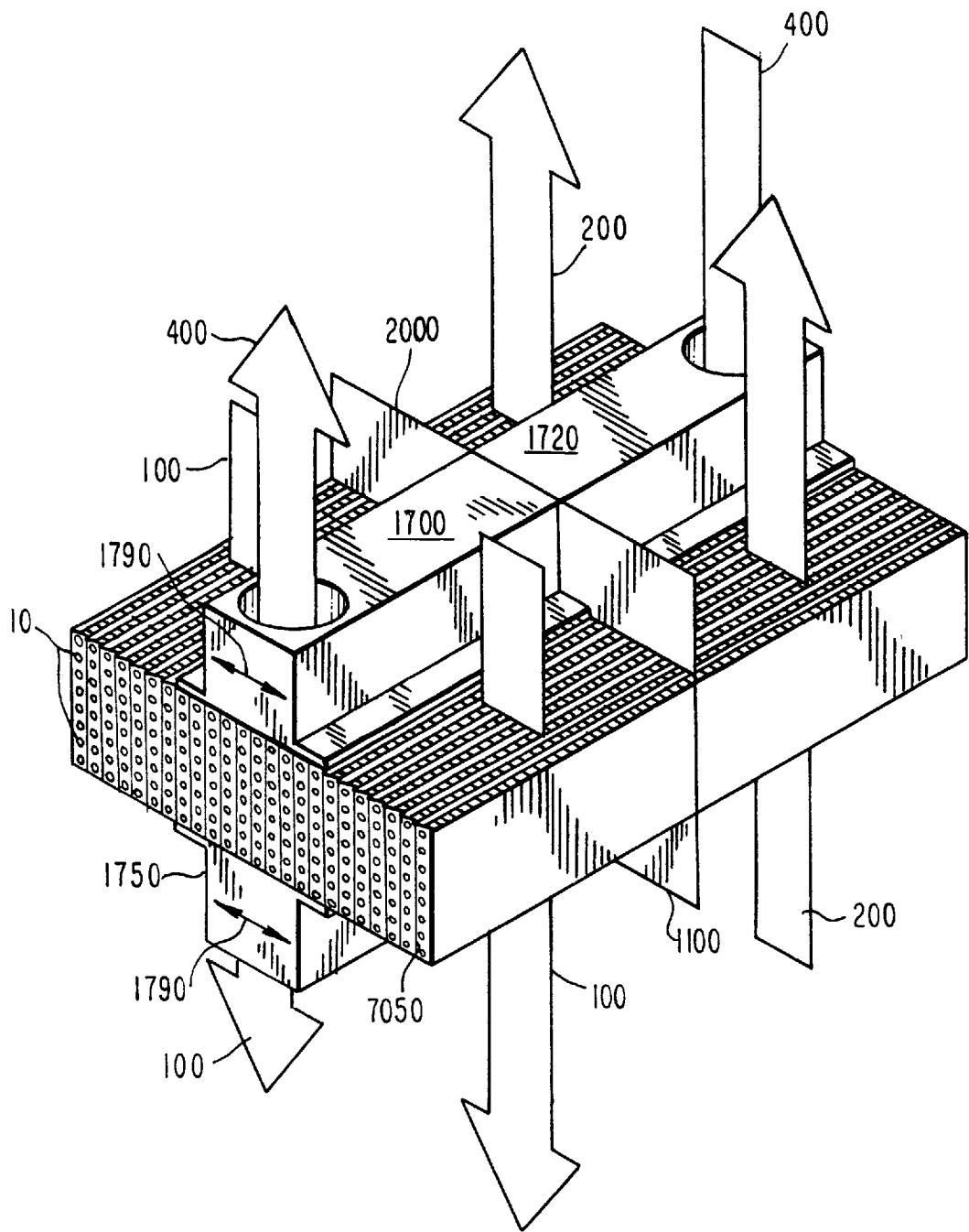
FIGS. 6(b,c) shows a portion of the dehumidifier of FIG. 6(a) in more detail along with the process, regeneration, and heating air streams.

FIGS. 6a, 6b show another embodiment of the dehumidifier according to the present invention. In accordance with this embodiment, the heat pipe heat exchanger remains stationary, and the heated and regeneration air streams periodically traverse the heat pipe heat exchanger in order the perform the desorption process. The dehumidifier includes an enclosure 1001, a plurality of heat pipe heat exchangers 10 forming a rectangular matrix 131, a stationary divider 2000, and a sliding divider 1100 which define an A side and a B side of the heat pipe heat exchangers 10. The A side of the heat pipe heat exchangers 10 are coated with a desiccant material such as silica gel, molecular sieve, or a polymer. The supply air enters via a supply air inlet 2200, traverses the A side of the heat pipe heat exchangers 10 and exits through a supply air outlet 1400. The cooling air streams enters via cooling air inlet 9000, traverses the B side of the heat pipe heat exchangers 10 and exits through cooling air outlet 2300. Dividers 7050 inserted between heat pipe heat exchangers insure that air flow through the heat pipe heat exchangers is vertical as shown in FIG. 6b.

The dehumidifier further includes an A-side upper plenum 1700, a B-side upper plenum 1720, and a lower plenum 1750. The A-side upper plenum 1700 is separated from the B-side upper plenum by stationary divider 2000. The heated air stream enters via heated air inlet 1000, flows through a flexible duct (not shown), where it enters the B-side plenum 1720 via a collar 3000. The heated air stream then traverses through the portion of the B side heat pipe heat exchangers 10 which are directly below the B-side upper plenum 1720 and into the lower translating plenum 1750. The heated air stream then traverses the length of the lower translating plenum 1750 and then travels through the A side of the heat pipe heat exchangers 10, into the A-side upper plenum 1700, through collar 3010, heated air output duct (not shown), and out the heated air outlet 2100.

A drive 1300 drives a chain or belt 1310, which in turn, rotates four sprockets 1500 and their respective screws 1501, causing the translating plenums 1700, 1720, and 1750 to traverse the width of the heat pipe heat exchangers 10. Tension is maintained in the belt or chain 131 by tensioning/ idler roll 1502. The sliding divider 1100 and seal 1200 separate the supply air flow 100 from the cooling air flow 200 while accommodating the movement of the lower plenum 1750.

Figure 6C:
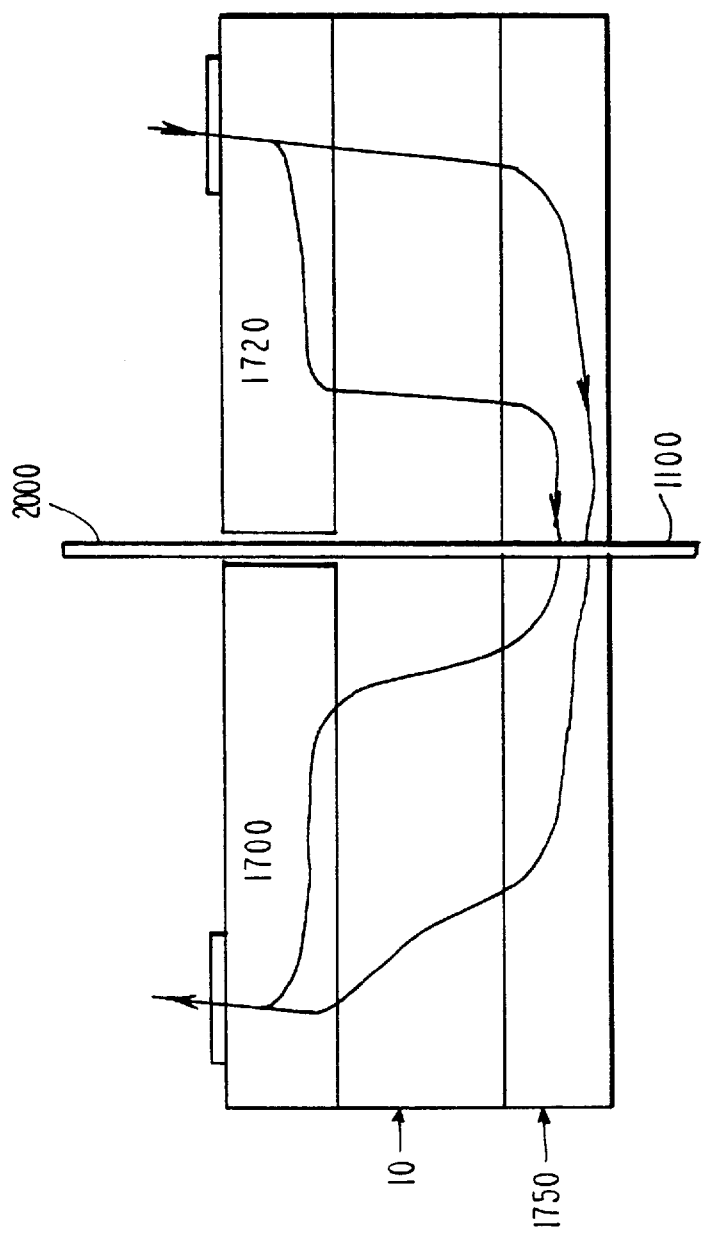

In accordance with the embodiment of FIGS. 6(*a–c*), the desiccant coated heat pipe heat exchangers 10 covered by the upper and lower plenums undergo desorption, while the remaining desiccant coated heat pipe heat exchangers undergo sorption. For example, referring again to the illustrative psychrometric chart of FIG. 5, the supply air begins as "outdoor" air at 95° F. dry bulb and 116 grains of moisture as it enters the desiccant coated portions (the A side) of the heat pipe heat exchangers 10 (point 1A). During operation, as supply air flow 100 passes through, the desiccant on the heat pipe heat exchangers are relatively cool and dry with a low surface vapor pressure. Since the supply air has a higher vapor pressure, moisture travels from the air to the desiccant, and the supply air is dried to 40 grains of moisture. However, because of the heat pipe heat exchanger 10, the heat generated by this condensation is adsorbed by the heat pipe heat exchangers 10, transferred to the B-side of the heat pipe heat exchangers 10, and then to the cooling air stream 200. Therefore, the temperature of the supply air flow 100 decreases slightly to 90° F. The cooling air stream 200 (point 2a–2b), also begins from an outdoor air source (95° F. dry bulb and 117 grains of moisture). In this example, the cooling air stream 200 has water sprayed into it and onto the B-side of the heat pipe heat exchangers. Due to evaporative cooling, the heat transferred from the A-side to the B-side of the heat pipe heat exchangers 10 is dissipated as the water spayed on the heat pipe heat exchangers evaporates into the cooling air stream, leaving the cooling air stream at 90° F. dry bulb and 206 grains of moisture. Moreover, since in this example the mass flow of stream 200 is equal to the mass flow of stream 100, the enthalpy (energy in BTU/lb) gain between points 2a–2b are equal to the enthalpy decrease between points 1a–1b.

If the dehumidifier were to be used in a creature comfort application, it may be desirable to further sensibly cool the supply air 100 fro point 1b to point 1c and then to point 1d in the manner described above with regard to FIG. 4.

Referring again to FIG. 6b,c, in order to provide a continuous dehumidification process, the upper and lower plenums 1700, 1720, 1750 traverse across the width of the heat pipe heat exchangers in a direction 1790. As the plenums move, the desiccant covered heat pipe heat exchangers which were initially exposed to the supply air stream are covered by the plenums 1700, 1720, 1750 in order to undergo desorption. Referring to FIG. 6b a heated air stream 400 enters the B-side upper plenum, passes through heat pipe heat exchangers 10, and into the lower plenum 1750. As the heated air passes through the B-side portion of the heat pipe heat exchangers 10, the heat is adsorbed by the heat pipe heat exchangers 10 and transferred to the desiccant coated fins 30 in A-side portion of the heat pipe heat exchangers 10. The heated air stream 400 then travels through the lower plenum 1750, and then through the A-side heat pipe heat exchangers 10 to serve as the regeneration air stream. The heat transferred to the A-side of the heat pipe heat exchangers 10 raises the surface vapor pressure of the desiccant, and causes the moisture from the desiccant to evaporate into the heated (regeneration) air stream 400. The constant supply of heat from the heated air stream 400 to the desiccant allows the desiccant to remain at or near a constant temperature as the moisture evaporates from the desiccant.

Referring again to the illustrative psychrometric chart of FIG. 5, the heated air stream traverses the path from point 4a to point 4b as it passes through the B-side of the heat pipe heat exchangers 10, and then traverses the path from point 3a' to 3b' as it travels through the lower plenum 1750, and then through the A-side of the heat pipe heat exchangers 10. In this example, the mass flow of supply air stream 100 is equal to the mass flow of regeneration air stream 300. Therefore, the moisture increase of air stream 300 must equal the moisture decrease of air stream 100 in order to return the desiccant to its initial state (point 1a). In addition, there must be an energy balance between the energy lost by the heated air flow 400 as it passes through the A-side of the heat pipe heat exchangers 10, and the energy gained by the heated air flow as it passes through the B-side of the heat pipe heat exchangers 10. As an illustration, outdoor air at 95° F. and 117 grains of moisture can be heated to 140° F. delivered as equal air stream 400, shown as point 4a. As the air stream 400 transfers heat to the B-side of the heat pipe heat exchangers 10 and to the desiccant in the A-side of the heat pipe heat exchangers, it cools sensibly to 116° F. and 117 grains of moisture (point 4b). The heated air stream 400 then passes through the lower plenum 1750, and then enters the A-side of the heat pipe heat exchangers at point 3a' (still at 116° F., 117 grains). The heated air stream 400 evaporates moisture from the desiccant and cools to 98° F. and 194 grains of moisture (point 3b'), thereby removing the 77 grains of moisture which has been adsorbed by the desiccant during the sorption process. Thereafter, as plenums 1700, 1720, 1750 move onto the next section of heat pipe heat exchangers, the temperature of the desiccant returns to 95° F. dry bulb, and the sorption process begins again.

In accordance with the embodiment of FIG. 6, the heated air stream 400 is used twice, once to heat the desiccant during the desorption process, and then again to carry away the moisture which evaporates from the desiccant during the desorption process. This provides the advantage of leaving the desiccant at a lower temperature at the conclusion of the desorption process. This feature can also be applied to the embodiment of FIG. 4 simply connecting the heated air outlet 112 to the regeneration air inlet 140. Similarly, separate heated air streams and regeneration air streams could be provided in the embodiment of FIG. 6 by dividing the lower plenum 1750 into an A-side lower plenum and a B-side lower plenum. This would naturally allow the sliding divider 1100 to be replaced with a stationary divider. In addition, while the second embodiment has been illustrated above with regard to a rectangular shaped matrix of heat pipe heat exchangers 10, it should be clear that a tubular wheel shaped matrix of heat pipe heat exchangers (such as the wheel 130 of FIG. 4) could also be used, with the upper plenums 1700, 1720 traversing an outer circumference of the wheel and the lower plenum 1750 traversing an inner circumference of the wheel.

What is claimed is:

1. A dehumidifier comprising:

a supply air stream passage, a second air stream passage, a third air stream passage, and a heated air stream passage;

a heat pipe heat exchanger having a first end and a second end, the first end of the heat pipe heat exchanger having a desiccant material applied thereon;

a drive mechanism coupled to the heat pipe heat exchanger, the supply air stream passage, the second air stream passage, the third air stream passage, and the heated air stream passage, the drive mechanism operating, during a sorption process, to expose the first end of the heat pipe heat exchanger to the supply air stream passage and the second end of the heat pipe heat exchanger to the second air stream passage, and operating, during a desorption process, to expose the first end of the heat pipe heat exchanger to the third air stream passage and the second end of the heat pipe heat exchanger to the heated air stream passage.

2. The dehumidifier according to claim 1, wherein the supply air stream passage includes a supply air stream inlet for receiving a supply air stream and a supply air stream outlet for outputting a dehumidified supply air stream, the dehumidified supply air stream having substantially the same temperature as the supply air stream.

3. The dehumidifier according to claim 1, wherein the second air stream passage includes a second air stream inlet for receiving a second air stream and a second air stream outlet for outputting the second air stream, the second air stream adsorbing the heat generated during the sorption process.

4. The dehumidifier according to claim 1, wherein the heated air stream passage transmits a heated air stream having a temperature in the range of 100° F. to 150° F.

5. A dehumidifier comprising:

a plurality of heat pipe heat exchangers, each of the plurality of heat pipe heat exchangers including a first end and a second end, the first end of the heat pipe heat exchangers having a desiccant material applied thereto, the plurality of heat pipe heat exchangers arranged to form a tubular wheel having a first end and a second end which correspond to the first and second ends of the heat pipe heat exchangers;

a plurality of partitions arranged around the tubular wheel, the plurality of partitions forming at least a first chamber and a third chamber around the first end of the wheel and a second chamber and a fourth chamber around the second end of the wheel, the first chamber having an input for receiving a supply air stream and an output for outputting a dehumidified supply air stream, the second chamber including an input for receiving an air stream and an output for outputting the air stream, the third chamber including an input for receiving a regeneration air stream and an output for outputting the regeneration air stream, the fourth chamber including an input for receiving a heated air stream and an output for outputting the heated air stream;

a drive mechanism coupled to the tubular wheel, the drive mechanism rotating the tubular wheel relative to the plurality of partitions so that any given point on the second end of the wheel sequentially traverses the first and third chambers and any given point on the second end of the wheel sequentially traverses the second and third chambers.

6. The dehumidifier according to claim 5, wherein the supply air stream maintains substantially the same temperature as it passes from the supply air stream input to the supply air stream output.

7. The dehumidifier according to claim 5, wherein the heated air stream has a temperature in the range of 50° F. to 150° F. as it enters the heated air stream input of the fourth chamber.

8. The dehumidifier according to claim 5, wherein the output of the fourth chamber is coupled to the input of the third chamber.

9. The dehumidifier according to claim 5, wherein the inputs of the third chamber and fourth chamber are coupled to a common air stream.

10. The dehumidifier according to claim 5, wherein the desiccant material is permanently bonded to the first end of the heat pipe heat exchangers.

11. The dehumidifier according to claim 5, wherein the plurality of partitions include a housing which surrounds the tubular wheel, a horizontal partition which extends inward from the housing and through a rotational axis of the tubular wheel, and a vertical partition which extends inward from the housing in a direction perpendicular to the rotational axis of the tubular wheel, the horizontal partition separating the first chamber from the third chamber and the second chamber from the fourth chamber, the vertical partition separating the first chamber from the second chamber and the third chamber from the fourth chamber.

12. The dehumidifier according to claim 11, wherein the housing is rectangular.

13. A dehumidifier comprising:

a plurality of heat pipe heat exchangers, each of the plurality of heat exchangers including a first end and a second end, the first end of the heat exchangers having a desiccant material applied thereto, the plurality of heat pipe heat exchangers arranged to form a matrix having an inner surface and an outer surface, the matrix further having a first end and a second end which correspond to the first and second ends of the heat pipe heat exchangers;

a plurality of partitions arranged around the matrix, the plurality of partitions forming at least a first chamber around the first end of the matrix and a second chamber around the second end of the matrix, the first chamber having an input for receiving a supply air stream and an output for outputting a dehumidified supply air stream, the second chamber including an input for receiving an air stream and an output for outputting the air stream, the first chamber further including a regeneration air output, the second chamber further including a regeneration air input;

a translating plenum extending over the first and second ends of a portion of the matrix, the translating plenum including a first upper translating plenum coupled to the regeneration air output and arranged over the first end of the upper surface of the portion of the matrix and a second upper translating plenum coupled to the regeneration air input and arranged above the second end of the lower surface of the portion of the matrix, and a lower translating plenum arranged below the first and second ends of the lower surface of the portion of the matrix, a heated air supply coupled to the second upper translating plenum for transmitted a heated air stream through the second upper translating plenum, through the second end of the matrix, into the lower translating plenum, through the first end of the matrix, through the first upper translating plenum, and out through a regeneration air outlet, the translating plenum periodically traversing the matrix to regenerate the desiccant on the first ends of the plurality of heat pipe heat exchangers.

14. The dehumidifier according to claim 13, wherein the matrix is a rectangular matrix including M×N heat pipe heat exchangers.

15. The dehumidifier according to claim 13, wherein the matrix is formed as a tubular wheel.

16. The dehumidifier according to claim 13, wherein the supply air stream maintains substantially the same temperature as it passes from the supply air stream input to the supply air stream output.

17. The dehumidifier according to claim 13, wherein the heated air supply has a temperature in the range of 50° F. to 150° F.

18. An adiabatic desiccant humidification process, comprising the steps of:

performing a sorption process by applying a supply air stream to a first, desiccant coated end of a heat pipe heat exchanger while applying a second air stream to a second end of the heat pipe heat exchanger to dehumidify the supply air stream while maintaining a substantially constant supply air stream temperature;

performing a desorption process by applying a heated air stream to the second end of the heat pipe heat exchanger while applying a regeneration air stream to the first end of the heat pipe heat exchanger in order to maintain a temperature of the desiccant on the first end of the heat pipe heat exchanger at a substantially constant temperature.

19. The adiabatic desiccant humidification process of claim 18, further comprising the step of heating the heated air stream to a temperature in a range of 50° F. to 150° F. prior to applying the heated air stream to the second end of the heat pipe heat exchanger.

* * * * *